Aug. 6, 1946. J. BULLOCK 2,405,110
DRILL
Filed July 31, 1945
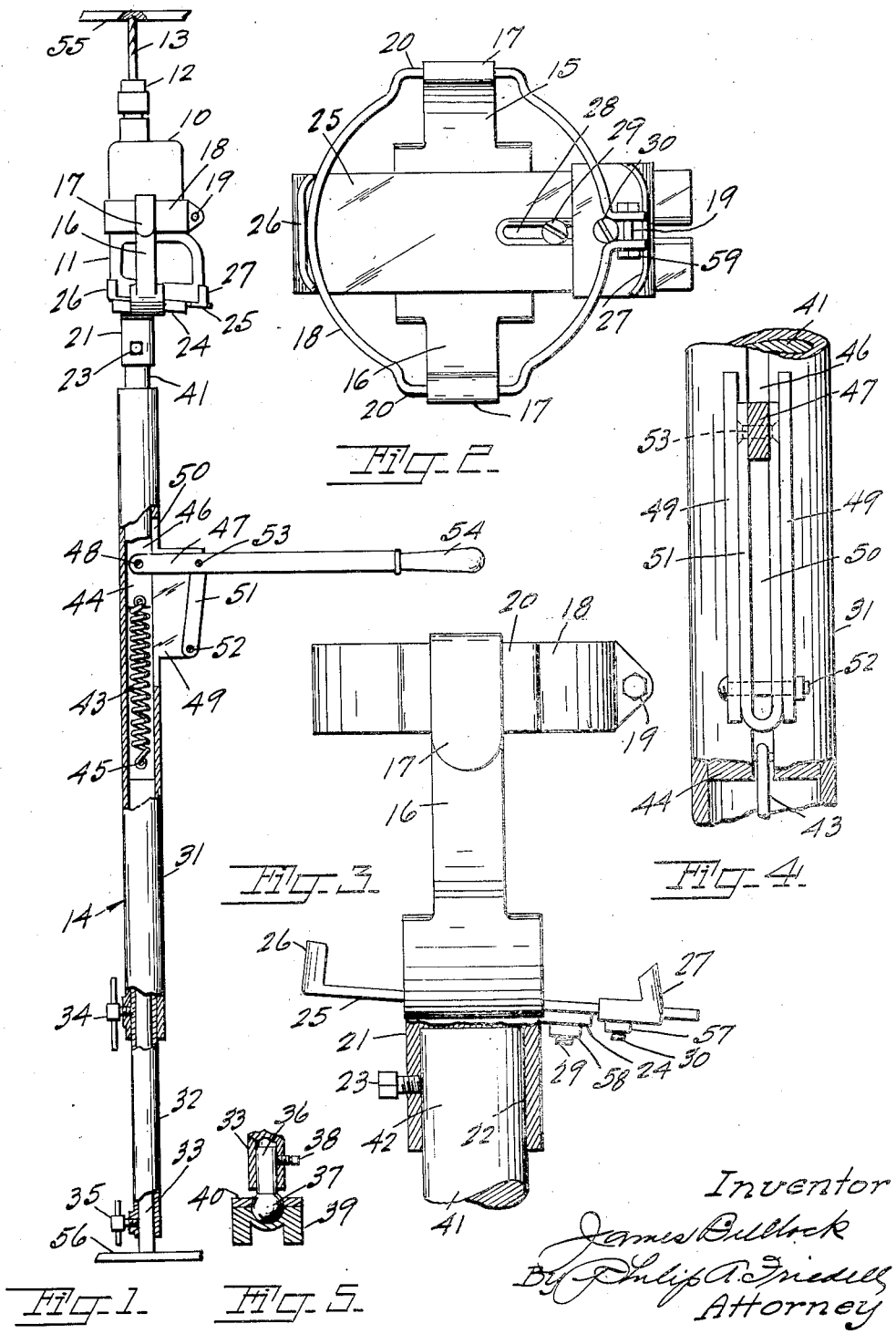
Inventor
James Bullock
By Philip A. Friedell
Attorney Patented Aug. 6, 1946

2,405,110

UNITED STATES PATENT OFFICE 2,405,110

DRILL

James Bullock, Richmond, Calif.

Application July 31, 1945, Serial No. 607,939

5 Claims. (Cl. 77—7)

This invention, an adjustable strut drill, is specifically designed for drilling holes in the field, holes which were or could not be drilled or punched previous to assembly or which have been incorrectly located, and is particularly useful in connection with ship, coach, bus, locomotive, aircraft, and similar construction and repair, and in all cases where backing for the strut is available, such as in the construction or repair of tanks, bulldozers, and the like, and also in connection with the structural steel skeletons in building construction.

The usual method employed in drilling holes in the field is to use a hand drill, in some cases hand operated, and in other cases electrically or pneumatically driven, but in all such cases, the pressure must be manually applied, resulting in slow and laborious drilling, and with no precision guidance for the drill, often resulting in holes which are not bored straight or at the proper angle.

This invention provides a method by which holes can be precision drilled at just the angle desired, with a minimum of effort and at maximum speed. In fact, with this invention a man can drill from four to six times as many holes in a given time as is possible with the present method of application of body pressure for the drill, and it is possible to drill in relatively inaccessible places where it would be impossible to drill with the conventional hand drill with manually applied pressure, because of the remote location of the pressure applicator.

The objects and advantages of the invention are as follows:

First, to provide a means for easing the labor or effort, and increase the speed of drilling in connection with the hand drilling of holes.

Second, to provide means as outlined with a strut element which is adjustable to provide backing for the required thrust of the drill.

Third, to provide means as outlined with means for axially aligning the drill to assure the precision drilling of holes.

Fourth, to provide means as outlined which will reduce the drilling effort to a minimum.

In describing the invention reference will be made to the accompanying drawing, in which:

Fig. 1 is a vertical elevation of the invention, partly shown in section and shown as drilling a hole in a ceiling or superposed member.

Fig. 2 is an enlarged top plan view of the adjustable motor or drill cradle.

Fig. 3 is a side elevation of Fig. 2.

Fig. 4 is an enlarged fragmentary elevation partly shown in section of the drill forcing means.

Fig. 5 is a fragmentary view of a magnetic foot for the strut.

The invention is used in connection with any conventional type of manually operable power drill, such as the motor driven drill 10 which is conventionally equipped with a handle or grip 11 and a chuck 12 for securing the drill bit 13.

A special cradle is provided for aligning the drill bit 13 axially with the strut member 14 and consists of two side arms 15 and 16 diametrically related and each terminating at the upper end in a fold portion 17. A clamp collar or band 18 is adjustable as to its diameter for slight variations in the diameter of the motor through the clamp screw 19 and is preferably flatted as indicated at 20 with the flatted portion slidable between the arm and the bent over portion 17. It will be noted that the drill chuck is eccentrically located on the specific type of drill shown, and this adjustment of the clamp collar permits lateral adjustment of the motor to bring the drill chuck in axial alignment with the strut.

The arms terminate in a base 21 which is provided with a socket 22, and a set screw 23, and the base has a projecting lip 24 on which is adjustably mounted a centering member 25 for cooperation with the handle 11, and this centering member terminates at one end in a clamp member 26 and has adjustably mounted on its other end a second clamp member 27, a suitable slot 28 being formed in the member 25 for adjustment of both, the member 25 and the member 27, bolts 29 and 30 providing means for securing the clamp members in adjusted position. Thus, with this cradle it is possible to adjust the drill chuck or the drill motor in axial alignment with the strut, and to immovably secure the drill or motor in that position.

The strut consists of a plurality of telescopic sections, shown as consisting of sections 31, 32 and 33 of pipe or other tubular structures slidably fitting one within the other. Although only three sections are shown, the number can be increased when greater spans are desired, by providing another section to fit either over the outside of, or inside of the section 33, suitable clamping means being provided on each section as indicated at 34 and 35 for securing the respective sections in adjusted position. A special magnetic foot, Fig. 5, is attachable to the end of the last strut as 33, and consists of a member having a shank 36 insertible in the thrust end of the terminal section and terminating in a ball 37 and secured in position as by a set screw 38. The socket consists of a permanent magnet base 39 and a cap 40 secured thereto, and with a socket formed therein to receive the ball 37. This magnetic foot is particularly desirable in connection with ship and similar construction jobs, since the tail end of the strut will then be self-supporting and requiring just a moderate pull to release it, and will adapt itself to surfaces other than parallel to the surface to be drilled.

The actuating mechanism consists of the plunger 41 which is slidable in one member 31 of the strut and the end 42 of which fits in the socket 22, with the screw 23 securing the cradle thereon, thus it is possible to use a cradle suited to the specific drill to be used.

This plunger is normally retracted by a tension spring 43 one end of which is secured to th inner end 44 of the plunger, and the other end secured as by means of a pin 45 passing through the main tubular section. The inner end of the plunger is slotted throughout a portion of its length as indicated at 46 to receive the inner end of the operating or thrust lever 47 and which is pivoted as indicated at 48, with the lever interposed between the walls of the slot. A pair of brackets 49 are formed integrally with or fixed on and project from one side of the section 31 in spaced relation to the drill motor, and a slot 50 is formed through the side wall of the section to clear the lever, with the brackets spanning the slot. A link 51 is pivoted at its lower end between the brackets as indicated at 52 and is shown as U-shaped with the lever pivoted between the legs of the U at the upper end as indicated at 53, and a suitable handle 54 is provided for the lever for manual operation.

For operation, the strut is adjusted for the span between the surface 55 in which the hole is to be drilled and the thrust face or backing 56. This adjustment need not be closer than within two or three inches. If the backing plate is made of steel or other magnetizable metal, the shoe, Fig. 5 can be used to hold the tail end in place while the drilling point is located at the other end, the handle 54 being drawn back to force the drill bit against the surface to be drilled, the motor then cut in circuit, after which it is merely necessary to draw back on the handle 54 with sufficient force to provide a suitable cutting speed.

When the hole is drilled, upon release of the handle 54, the plunger with its drill will be retracted by the spring 43 ready for the next job.

In adjusting the drill in its cradle, the bolt 19 is tightened just enough to hold the motor while the lower end of the motor or drill grip 11 rests on the member 25, and is then slid under the ears 17 to bring the chuck 12 in line with the strut member. The clamp member 27 is then adjusted to clamp the grip between that member and the member 26 and the nut 57 is then tightened. The member 25 and the band 18 are then adjusted to bring the chuck in axial alignment and the nuts 58 and 59 are then tightened.

It will be noted that the ears 17 permit lateral, axial, and angular adjustment of the band 18 to compensate for eccentricity of the chuck 12 and for any adjustment of the support 25.

I claim:

1. In combination with a power-driven drill having a chuck at one end; an adjustable strut having a plunger slidable in one end thereof and means for manually advancing and retracting said plunger; a cradle removably secured on the outer end of said plunger and universally adjustable for securing and adjusting said power-driven drill for adjusting the chuck in axial alignment with said strut; said plunger having a lever receiving slot formed centrally throughout a portion of the inner end, and a lever passage formed through the side wall of said strut and a pair of spaced parallel brackets spanning said lever passage; said means for manually advancing and retracting said plunger comprising a lever passing through said lever passage and pivoted within said lever receiving slot, a yoke having one end pivoted at the lower end between said brackets and having said lever pivoted thereto at the other end to compensate for arcuate movement of the lever.

2. In combination with a power-driven drill having a chuck at one end; an adjustable strut having a plunger slidable in one end thereof and means for manually advancing and retracting said plunger; a cradle removably secured on the outer end of said plunger and universally adjustable for securing and adjusting said power-driven drill for adjusting the chuck in axial alignment with said strut; said cradle comprising a base member having a socket for said plunger and means for securing the base member on the socket; a pair of arms diametrically related and extending upwardly from said base; a band adjustable axially, laterally and angularly and supported by said arms and means for tightening said band to bodily secure the power-driven drill therein; and clamp members adjustable on said base for adjusting and securing the other end of the power-driven drill, whereby an eccentrically located chuck on a power-driven drill can be axially aligned with the strut.

3. In means for supporting a power-driven drill during drilling operations; a series of tubular telescopic sections and means for securing the respective sections in adjusted position; a plunger slidable in the largest of the sections and having one end projecting from the end of the section; a through slot formed axially in the other end of said plunger and extending throughout a portion of the length thereof; a longitudinal passage formed through one side of said largest section and a bracket comprising two plates in parallel and mounted on the respective sides of said passage; a rocker member having one end pivoted between said plates; and a lever having one end pivoted in said slot and intermediately pivoted to the other end of said rocker member to compensate for arcuate movement, and operating through said longitudinal passage, a handle for said lever, and means for aligning and securing the power-driven drill on said one end of said plunger.

4. A structure as defined in claim 3; said means for aligning and securing the power-driven drill comprising; a base securable to said one end of said plunger and having a pair of diametric arms; a band adjustably supported by said arms and means for tightening said band about the body of said power-driven drill; and adjustable clamping means for adjusting and securing the rearward end of said power-driven drill.

5. A strut for a manually-operable power-driven drill comprising; a series of telescopic tubular sections and means for securing the respective sections in any adjusted position; a plunger slidable in the largest of the sections and having one end projecting therefrom and having a longitudinal slot formed in the other end, and a longitudinal passage formed through one side of said largest section and with said passage and said slot alignable; a bracket plate on each side of said passage and projecting in parallel; a U-shaped rocker arm having the U-end pivoted between said plates; and a lever having a handle at one end and having the other end pivoted in said slot and intermediately pivoted between the legs at the other end of said rocker arm to compensate for arcuate movement; and means for aligning and securing the power-driven drill to said one end of said plunger.

JAMES BULLOCK.